INVENTORS
James J. Harty, Norris D. Hansen
and Henry Dux
BY Munn, Liddy, Nathanson & March
ATTORNEYS Sept. 17, 1957 J. J. HARTY ET AL 2,806,911
THEFT LOCK SYSTEM
Filed July 20, 1954 2 Sheets-Sheet 2

INVENTORS
James J. Harty, Norris H. Hansen
and Henry Jux
BY
Munn, Liddy, Nathanson & March
ATTORNEYS

United States Patent Office 2,806,911
Patented Sept. 17, 1957

2,806,911

THEFT LOCK SYSTEM

James J. Harty and Norris D. Hansen, Brooklyn, N. Y., and Henry Dux, Norwich, Conn.

Application July 20, 1954, Serial No. 444,416

4 Claims. (Cl. 200—43)

This invention relates to a theft lock system for vehicles and, more particularly, to a theft lock system which is electrically operable and which controls the ignition system of a vehicle and another system of the same vehicle to prevent the theft of the vehicle.

The need for means to prevent the theft of automobiles and the like is well recognized. Various devices have, in the past, been proposed to assist in the prevention of such thefts. These suggested devices have not proven to be commercially feasible because of the expense involved in the manufacture, difficulty of installation and poor operability.

A device has been suggested in which a plurality of rotary switches was utilized with each switch having a series of contacts. Three such switches were utilized, each with a series of contacts. In order to start the engine, the correct pre-set combination of such switches had to be utilized, whereupon the ignition key could be turned on and the engine would start. However, the normal operator of a vehicle would, in most instances, simply turn the ignition key off when stopping the car and not turn the combination switches, whereupon the thief would simply have to cross wires or utilize other means in order to start the car to steal the same, while the combination switches were, for the most part, left in their correct position. The arrangement suggested, therefore, did not eliminate the problem in question.

It is an object of the present invention to provide an electric theft lock system comprising a combination electric safety lock whose construction makes it necessary to turn at least one of the combination switches in order to stop the engine.

It is another object of the present invention to provide an electric safety lock for vehicles which will cause an alarm to be sounded on the attempted theft of the vehicle, or prevent the vehicle from being started.

Another object of the present invention is to provide an electric theft lock system which is absolutely dependable and will operate under all conditions.

A further object of the present invention is to provide a combination electric theft lock system which will prevent a vehicle engine from being started unless the correct combination is utilized.

A further object of the present invention is to provide an electric theft lock system for vehicles having all of the desired advantages which is, nevertheless, inexpensive to manufacture and simple to construct and install.

Other objects and advantages of the present invention are set forth in greater detail in the accompanying specification taken in conjunction with the accompanying drawing, in which.

Figure 1:
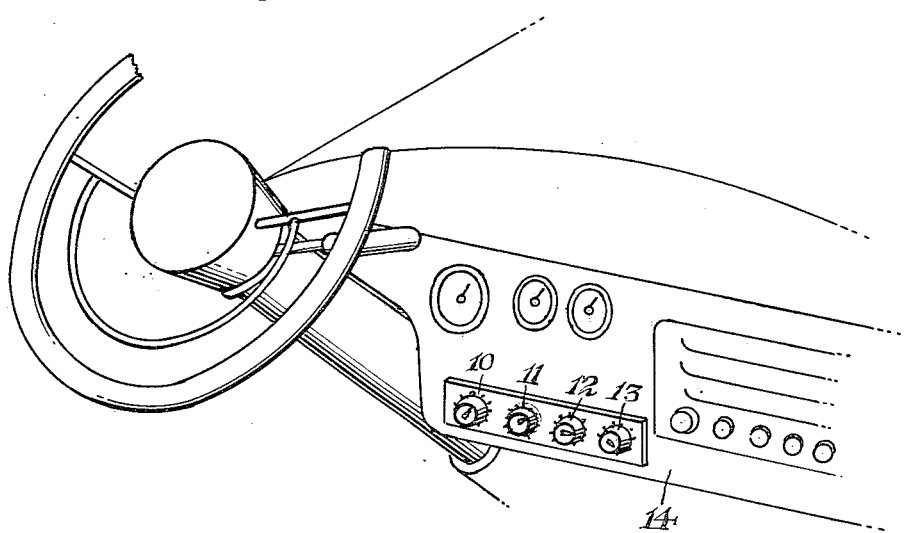
Fig. 1 is a perspective view of the present invention in position on the dashboard of a vehicle.
Figure 2:
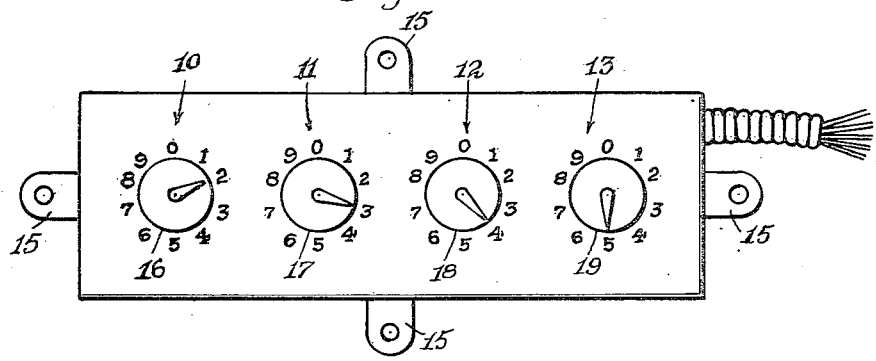
Fig. 2 is a front elevation of the present invention.

Referring to the drawings, there is shown an electric theft lock system comprising a plurality of rotary switches 10, 11, 12 and 13. As shown each of such switches has a series of ten positions. The switches are mounted in a dashboard 14 of a vehicle by any suitable securing means, as for example, fastening bars 15 which pass through slots in the edges of opposite housing members and can be fastened through the openings near the end portions thereof to the automobile dashboard by means of screws or the like. While this particular type of fastening means has been shown, it will be understood that any other suitable fastening means may be utilized. Each of the switches has a rotatable dial 16, 17, 18 and 19 with ten numbers disposed around it on the panel, as shown, corresponding to the ten positions on each of the rotary switches as hereinbefore described. Preferably the rotary dials are identical in outward appearance for reasons hereinafter set forth.

Each of the switches of the present invention is preferably also of the same construction and for brevity sake one switch is hereinafter described in detail, namely, switch 10. This switch comprises an outer contact segment 22 and an inner contact segment 23 having openings 180° apart.

A brush arm 24 is mounted rotatably on a central shaft and supports two contact brushes or wipers adapted to ride over the outer and inner segments 22 and 23. The brush arm 24 is selectively positioned by the dial 16. With the brush arm 24 in the position shown and with the knowledge that the rotary switches 11, 12 and 13 are of the same construction as the switch 10 hereinabove described, a circuit can now be traced as shown in Fig. 3.

In the event rotary dial switch 13 is in the position shown and any of the other three switches 10, 11 or 12 are positioned on a contact segment, a second circuit is completed through the horn of the car. This horn circuit will be described shortly.

Figure 3:
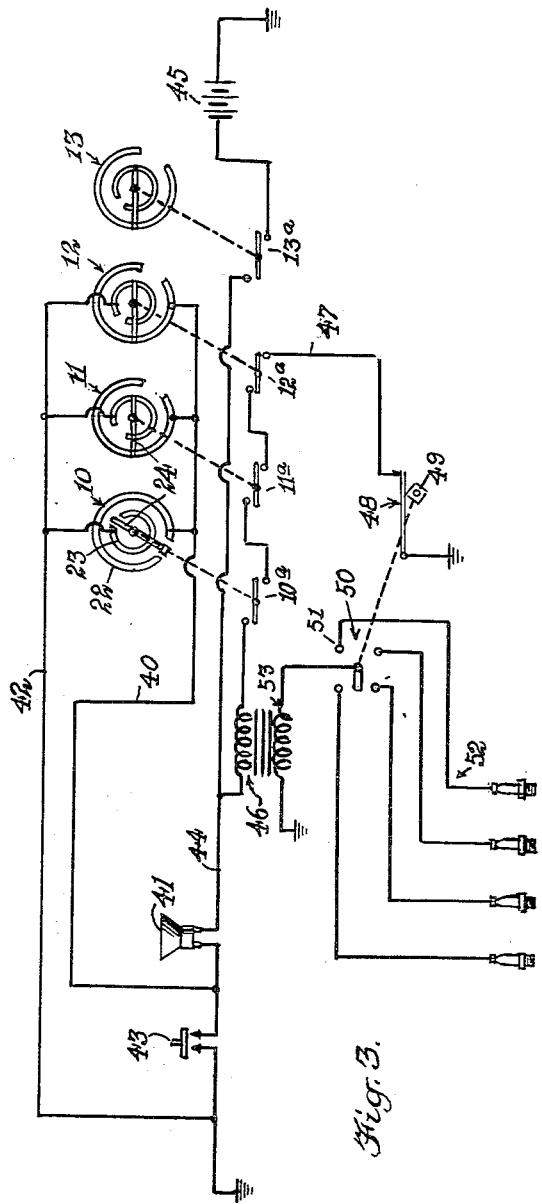
Fig. 3 is a circuit diagram of a form of the present invention.

Referring to the circuit shown in Fig. 3, the three switches 10, 11 and 12 have their outer segments 22 connected with a wire 40 which connects with the horn 41 of the vehicle. The inner segment 23 is connected with a wire 42 to a ground as shown. A horn button 43 is located between the ground and the horn 41. The horn 41 is connected to another wire 44. The wire 44 may have battery potential from the battery 45 and when this is effected the horn is in readiness to blow. Obviously when the wire 44 is energized, the horn 41 may be blown simply by depressing the horn button. The switch 13 is a manually positioned ignition dial switch and is preset so that upon turning the same to proper position it will provide a circuit from the battery 45 through the switch 13a to the wire 44. As shown, an ignition coil 46 is electrically connected to the wire 44. Each of the rotary switches 10, 11 and 12 are also preset so that by turning them each to one proper position, the switches 10a, 11a and 12a respectively controlled by them are closed whereby the circuit will be completed through the ignition coil 46, through the switches 10a, 11a and 12a, wire 47, make-and-break switch 48 to the ground. In this position the vehicle will start.

It will therefore be realized that when the rotary switches are in the position shown, the respective ignition contacts are electrically joined to form a continuous circuit through the safety dial lock and the motor will start. Rotary switch 13 acts as the ignition switch dispensing with the need for any keys, etc., while maintaining the same outward appearance of being preset in combination with the other dial switches so that it is unknown as the ignition dial switch to any one except the operator of the vehicle. If rotary dial switch 13 is in any position other than the position shown in Fig. 3, obviously the car will not start.

It will be understood, however, that if any of the switches 10a, 11a or 12a are open, the circuit hereindescribed will be broken and another circuit will be closed through the horn 41, wire 40, outer horn ring 22, brush arm 24, inner horn ring 23, wire 42 and ground. With this circuit the horn will blow sounding the alarm. While the alarm circuit is mentioned as involving the horn, it will be understood that the arrangement of the switches may be such that various other parts of the car may become inactive unless the switches are closed so that the car will not start without in any way being connected to an alarm system.

In order to shut off the motor without sounding the horn according to the present invention, it is therefore only necessary to turn the ignition dial 13 to a position other than that shown whereupon no circuit will be made. When it is thus found necessary to turn this rotary dial 19, it is an easily rememberable and simple operation to turn one of the other dials 16, 17 or 18 alongside of the rotary dial 19 whereby the circuit is broken should the car be attempted to be started. With the ignition dial placed in the proper position by chance, the horn will thereupon blow.

In this circuit, in order to shut off the motor of the vehicle without sounding the horn, according to the present invention, it is therefore necessary to turn the rotary dial 19 opening the dial switch 13a. Finding it thus necessary to turn the rotary dial 19, it is an easily rememberable and simple operation to turn another or others of the dials 16, 17 and 18 alongside of the rotary dial 19 whereby the circuit is broken.

In the showing in Fig. 3, obviously as the rotary dials are preferably identical in outward appearance and as any one of them may act as the ignition dial switch by simple rearrangement of the circuit, a potential thief is presented with any of 10,000 combinations. In addition there is presented novel structure whereby the operator of a vehicle must turn the appropriate dial in order to shut off the motor and will thereby find it easy to turn at initially the same time, one or more of the other dials. Further, the necessity of ignition keys which are easily lost or stolen, has been eliminated.

It will be understood that while the invention has been described in some detail, variations and modifications may be made without departing from the spirit of the invention or the scope of the appended claims.

We claim:

1. An electric theft lock system adapted to be connected to the ignition circuit and another circuit of a motor vehicle comprising a plurality in excess of two of selectively positionable members, each adapted to be manually positioned; means including circuit elements whereby one position of each, except one, of said members makes continuous a first circuit and simultaneously maintains open a second circuit; means whereby said second circuit is made continuous and said first circuit simultaneously opened when any one of the said members except the said one is positioned in other than said one position; a source of electricity; and means simultaneously connecting both said first and second circuits with, or disconnecting said circuits from, said source of electricity in response to selective positioning of said one member having a relatively large number of possible positions.

2. An electric theft lock system adapted to be connected in the ignition circuit and horn circuit of a motor vehicle comprising a plurality in excess of two of selectively positionable members, each adapted to be manually positioned, means including circuit elements whereby one position of each except one of said members makes continuous a first circuit and simultaneously maintains open a second circuit, means whereby said second circuit is made continuous and said first circuit simultaneously opened when any one of the said members except the said one is positioned in other than said one position; a source of electricity; and means simultaneously connecting both said first and second circuits with, or disconnecting said circuits from, said source of electricity in response to selective positioning of said one member having a relatively large number of possible positions.

3. An electric theft lock system adapted to be connected in the ignition circuit and horn circuit of a motor vehicle comprising a plurality of selectively positionable members, each adapted to be manually positioned, means including circuit elements whereby one position of said members makes continuous a first circuit and simultaneously maintains a second circuit open, means whereby said second circuit is made continuous and said first circuit simultaneously opened upon any one of said members being positioned in other than said one position, an additional selectively positionable member having a relatively large number of possible positions, a source of electricity, and means simultaneously connecting both said first and second circuits with said source of electricity only when said additional member is in one of its positions.

4. An electric theft lock system adapted to be connected in the ignition circuit and horn circuit of a motor vehicle comprising a plurality of selectively positionable members, each adapted to be manually positioned, means including circuit elements whereby one position of said members makes continuous a first circuit and simultaneously maintains a second circuit open, means whereby said second circuit is established and said first circuit simultaneously opened upon any one of said members being positioned in other than said one position, an additional selectively positionable member adapted to be manually positioned, a source of electricity, and means simultaneously connecting both said first and second circuits with, or disconnecting said circuits from, said source of electricity in response to selective positioning of said additional member in one of a relatively large number of possible positions.

References Cited in the file of this patent

UNITED STATES PATENTS

| | | |
|---|---|---|
| 1,286,705 | Meskill | Dec. 3, 1918 |
| 1,478,850 | Davis | Dec. 25, 1923 |
| 2,385,285 | Kolias | Sept. 18, 1945 |
| 2,491,595 | Williams | Dec. 20, 1949 |
| 2,583,752 | Smith | Jan. 29, 1952 |
| 2,606,237 | Chase | Aug. 5, 1952 |
| 2,650,989 | Heath | Sept. 1, 1957 |